United States Patent
Nishioka (10) Patent No.: US 11,200,450 B2
(45) Date of Patent: Dec. 14, 2021

(54) INFORMATION PROCESSING APPARATUS AND NON-TRANSITORY COMPUTER READABLE MEDIUM FOR SELECTING A PROPER VERSION OF A RECOGNITION DICTIONARY THAT IS NOT NECESSARILY A LATEST VERSION

(71) Applicant: FUJIFILM BUSINESS INNOVATION CORP., Tokyo (JP)

(72) Inventor: Shintaro Nishioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 153 days.

(21) Appl. No.: 16/596,838

(22) Filed: Oct. 9, 2019

(65) Prior Publication Data

US 2020/0334500 A1 Oct. 22, 2020

(30) Foreign Application Priority Data

Apr. 17, 2019 (JP) .............................. JP2019-078853

(51) Int. Cl.
*G06K 9/62* (2006.01)

(52) U.S. Cl.
CPC ......... *G06K 9/6255* (2013.01); *G06K 9/6221* (2013.01); *G06K 9/6263* (2013.01); *G06K 9/6293* (2013.01)

(58) Field of Classification Search
None
See application file for complete search history.

(56) References Cited

U.S. PATENT DOCUMENTS

| 6,341,176 | B1 * | 1/2002 | Shirasaki | G06K 9/72 |
| | | | | 382/229 |
| 9,098,759 | B2 * | 8/2015 | Kubota | G06K 9/03 |
| 9,152,883 | B2 * | 10/2015 | Urbschat | G06K 9/03 |
| 10,796,143 | B2 * | 10/2020 | Kubota | G06K 9/344 |
| 10,867,168 | B2 * | 12/2020 | Nishioka | G06K 9/00463 |
| 2013/0308862 | A1 * | 11/2013 | Kubota | G06K 9/03 |
| | | | | 382/182 |
| 2019/0294912 | A1 * | 9/2019 | Takabayashi | G06K 9/4604 |
| 2020/0334500 | A1 * | 10/2020 | Nishioka | G06K 9/6255 |

FOREIGN PATENT DOCUMENTS

| JP | H08-287191 A | 11/1996 |
| JP | H09-91385 A | 4/1997 |
| JP | 2016-212812 A | 12/2016 |

* cited by examiner

*Primary Examiner* — Tahmina N Ansari
(74) *Attorney, Agent, or Firm* — Oliff PLC (57) ABSTRACT

An information processing apparatus includes a selection unit that, when a target document is recognized, selects a first mode in which a latest version of a recognition dictionary is applied, or a second mode in which a version of the recognition dictionary is applied, the version of the recognition dictionary having a highest correct answer rate among plural versions different from the latest version, the correct answer rate being obtained from a recognition result and a confirmation or correction result of each of plural documents.

15 Claims, 9 Drawing Sheets

INFORMATION PROCESSING APPARATUS AND NON-TRANSITORY COMPUTER READABLE MEDIUM FOR SELECTING A PROPER VERSION OF A RECOGNITION DICTIONARY THAT IS NOT NECESSARILY A LATEST VERSION

CROSS-REFERENCE TO RELATED APPLICATIONS

This application is based on and claims priority under 35 USC 119 from Japanese Patent Application No. 2019-078853 filed Apr. 17, 2019.

BACKGROUND

(i) Technical Field

The present disclosure relates to an information processing apparatus and a non-transitory computer readable medium.

(ii) Related Art

For example, Japanese Unexamined Patent Application Publication No. 2016-212812 describes an information processing apparatus capable of reducing man-hours when a character recognition target is manually input. The information processing apparatus includes classification means for classifying a character recognition target into one of three types, and extraction means for extracting a character recognition result of a character recognition target when the character recognition target is classified into a first type by the classification means. The information processing apparatus also includes first control means for extracting a character recognition result of a character recognition target and for controlling the character recognition target to be manually input when the character recognition target is classified into a second type by the classification means, and second control means for controlling a character recognition target to be manually input by a plurality of persons when the character recognition target is classified into a third type by the classification means.

Japanese Unexamined Patent Application Publication No. 8-287191 describes an optical character reading apparatus that reads a sample document in which characters of a learning target is written and registers a learning character pattern of the target in a recognition dictionary. The optical character reading apparatus includes a scanner unit that detects an image of a document, a dictionary memory that stores a recognition dictionary in which a standard character pattern is registered in advance in correspondence to a character code, and a recognition unit that extracts a character pattern from the image of the document detected by the scanner unit, that verifies the extracted character pattern against the recognition dictionary, and that outputs the recognition result. The optical character reading apparatus also includes a correct answer information memory that stores correct answer information in which a correct answer character code for each of the characters of the learning target is given to the sample document based on an input operation, and a controller that controls the scanner unit and the recognition unit to obtain the recognition result for the sample document, and then registers a learning character pattern in the recognition dictionary based on the correct answer information.

Japanese Unexamined Patent Application Publication No. 9-91385 describes a method of adding a character recognition dictionary, the method adding recognition data of characters to a character recognition dictionary. The method of adding the character recognition dictionary reads a character, performs character recognition based on a recognition dictionary consisting of information for recognizing a character of a read character image in accordance with the feature of the character, displays the recognition result, when the displayed recognition character is corrected, stores the corrected character in association with the character image of the character, extracts the feature of the stored character image, and adds the character to the character recognition dictionary.

SUMMARY

In order to obtain a recognition result of a document, a recognition dictionary may be used. This recognition dictionary is updated to the latest version by using learning data accumulated at a predetermined interval in order to increase recognition accuracy. However, for example, when a specific bias (for example, writing habit or fading of a character of a writer) is frequently generated in the learning data, the latest version becomes a recognition dictionary having a specific bias. When this latest version is used, the recognition accuracy is expected to be increased for documents having similar biases. Otherwise, the recognition accuracy may not be increased. In this case, the recognition accuracy is more likely expected be increased by using the recognition dictionary of another version prior to the latest version.

Aspects of non-limiting embodiments of the present disclosure relate to providing an information processing apparatus and a non-transitory computer readable medium capable of, when a document is recognized by using a recognition dictionary, selecting a mode in which a latest version is applied or a mode in which a recognition dictionary of a proper version is applied from among a plurality of versions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a selection unit that, when a target document is recognized, selects a first mode in which a latest version of a recognition dictionary is applied, or a second mode in which a version of the recognition dictionary is applied, the version of the recognition dictionary having a highest correct answer rate among plural versions different from the latest version, the correct answer rate being obtained from a recognition result and a confirmation or correction result of each of plural documents.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the accompanying drawings.

Figure 1:
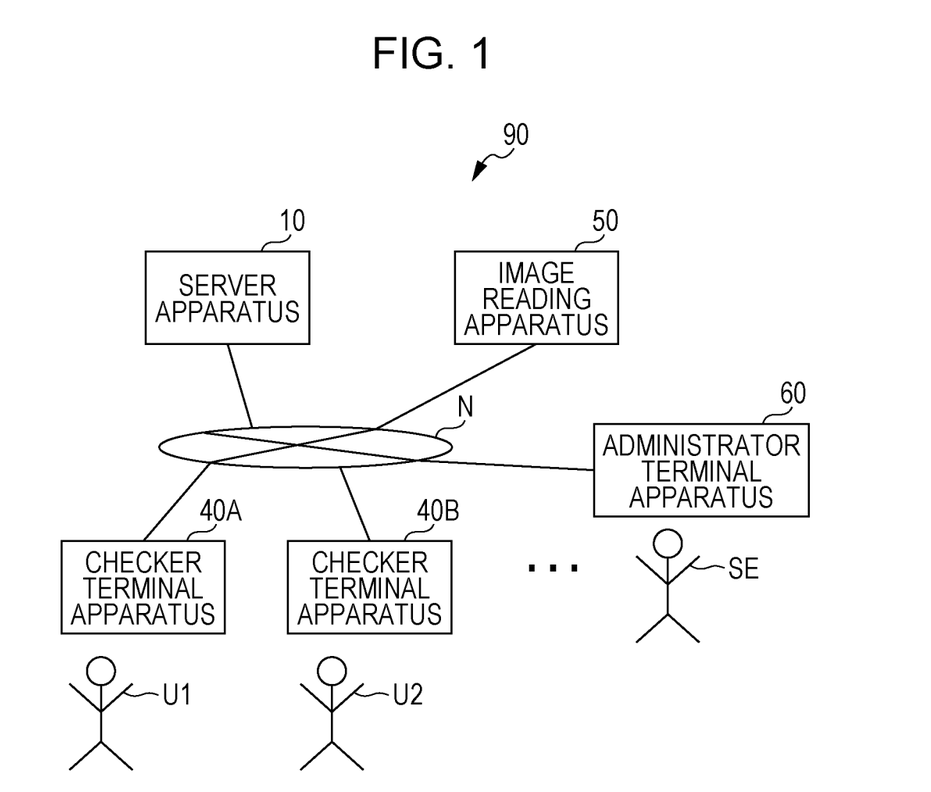
FIG. 1 is a diagram illustrating an example of a configuration of an information processing system according to an exemplary embodiment.

FIG. 1 is a diagram illustrating an example of a configuration of an information processing system 90 according to the exemplary embodiment.

As illustrated in FIG. 1, the information processing system 90 according to the exemplary embodiment includes a server apparatus 10, checker terminal apparatuses 40A, 40B, . . . , an image reading apparatus 50, and an administrator terminal apparatus 60. The server apparatus 10 is an example of an information processing apparatus.

The server apparatus 10 is communicably connected to the checker terminal apparatuses 40A, 40B, . . . , the image reading apparatus 50, and the administrator terminal apparatus 60 via a network N. Examples of the server apparatus 10 include general-purpose computers, such as a server computer and a personal computer (PC). Examples of the network N include the Internet, a local area network (LAN), and a wide area network (WAN).

The image reading apparatus 50 has a function of optically reading a form of a paper medium or the like to acquire an image, and transmitting the acquired image (hereinafter, referred to as "form image") to the server apparatus 10. Note that, for example, any one of various forms including a plurality of items, such as an address field and a name field, are used as the form. Handwritten characters, printed characters, or the like, are written in each of the plurality of items in the form. This form is an example of a document. Although described in detail later, the server apparatus 10 performs an optical character recognition (OCR) process on the form image received from the image reading apparatus 50, and acquires the recognition result of an image corresponding to each of the plurality of items. The recognition result includes, for example, a character string indicating a continuous character string including one or more characters. In the form, a region in which a description corresponding to an item may be written is defined by a frame or the like, and the region in which the description may be written is defined as a region of a recognition target. The OCR process is performed on the region that is defined (hereinafter referred to as "definition region"), and a character string in an image corresponding to each of the plurality of items is acquired.

The checker terminal apparatus 40A is a terminal apparatus operated by a checker (user) U1 who performs a confirmation work, and the checker terminal apparatus 40B is a terminal apparatus operated by a checker U2 who performs a confirmation work. When it is not necessary to distinguish the plurality of checker terminal apparatuses 40A, 40B, . . . , from one another, the checker terminal apparatuses 40A, 40B, . . . , may be also collectively referred to as a checker terminal apparatus 40. When it is not necessary to distinguish the plurality of checkers U1, U2, . . . , from one another, the checkers U1, U2, . . . , may be also collectively referred to as a checker U. Examples of the checker terminal apparatus 40 include a general-purpose computer such as a personal computer (PC), and portable terminal apparatuses, such as a smartphone and a tablet terminal. A confirmation work application program (hereinafter also referred to as "confirmation work application") with which the checker U performs the confirmation work is installed in the checker terminal apparatus 40, and a user interface (UI) window for the confirmation work is generated and displayed. Here, the confirmation work represents a work of confirming or correcting the recognition result of a character or the like included in a form image.

The administrator terminal apparatus 60 is a terminal apparatus operated by a system administrator SE. The system administrator SE sets form definition data through a form definition window (described later). Examples of the administrator terminal apparatus 60 include a general-purpose computer such as a personal computer (PC), and portable terminal apparatuses, such as a smartphone and a tablet terminal.

The server apparatus 10 performs control of causing the UI window of the checker terminal apparatus 40 to display an image of each item (hereinafter referred to as "item image") included in the form image in association with a character string obtained by the OCR process. The checker U confirms whether the character string corresponding to the item image is correct while viewing the item image. The checker U inputs the character string as it is to the UI window when it is correct as the result of confirmation or inputs a correct character string to the UI window when it is incorrect. The checker terminal apparatus 40 transmits, as a confirmation result, the character string received through the UI window to the server apparatus 10. The server apparatus 10 outputs a final recognition result based on the confirmation result from the checker terminal apparatus 40, and performs control of causing the UI window of the checker terminal apparatus 40 to display the final recognition result.

Figure 2:
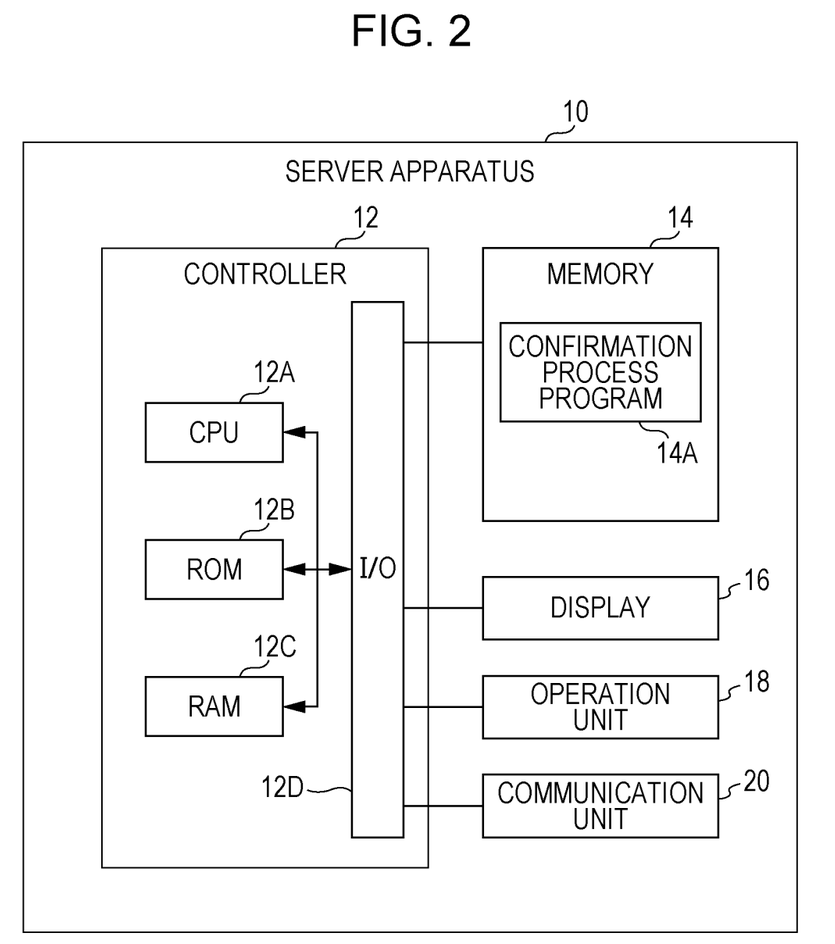
FIG. 2 is a block diagram illustrating an example of an electrical configuration of a server apparatus according to the exemplary embodiment.

FIG. 2 is a block diagram illustrating an example of an electrical configuration of the server apparatus 10 according to the exemplary embodiment.

As illustrated in FIG. 2, the server apparatus 10 according to the exemplary embodiment includes a controller 12, a memory 14, a display 16, an operation unit 18, and a communication unit 20.

The controller 12 includes a central processing unit (CPU) 12A, a read only memory (ROM) 12B, a random access memory (RAM) 12C, and an input/output (I/O) interface 12D, and these units are connected to one another via a bus.

Functional units including the memory 14, the display 16, the operation unit 18, and the communication unit 20 are connected to the I/O interface 12D. The functional units are communicable with the CPU 12A through the I/O interface 12D.

The controller 12 may be configured as a sub-controller that controls the operation of part of the server apparatus 10, or may be configured as part of a main controller that controls the overall operation of the server apparatus 10. For example, an integrated circuit such as a large scale integration (LSI) circuit or an integrated circuit (IC) chip set is used for part or all of the blocks of the controller 12. The blocks may use individual circuits or may use a circuit integrating part or all of the blocks. The blocks may be provided as one unit, or part of the blocks may be provided separately. Moreover, part of each of the blocks may be provided separately. The integration of the controller 12 is not limited to LSI, and may use a dedicated circuit or a general-purpose processor.

As the memory 14, for example, a hard disk drive (HDD), a solid state drive (SSD), or a flash memory is used. The memory 14 stores a confirmation process program 14A for performing a form confirmation process according to the exemplary embodiment. The confirmation process program 14A may be stored in the ROM 12B.

The confirmation process program 14A may be installed in, for example, the server apparatus 10 in advance. The confirmation process program 14A may be stored in a nonvolatile storage medium or distributed via the network N, and may be installed in the server apparatus 10. Examples of the nonvolatile storage medium include a compact disc read only memory (CD-ROM), a magneto-optical disk, an HDD, a digital versatile disc read only memory (DVD-ROM), a flash memory, and a memory card.

The display 16 may use, for example, a liquid crystal display (LCD) or an organic electro luminescence (EL) display. The display 16 may include a touch panel as one unit. The operation unit 18 is provided with, for example, a device, such as a keyboard or a mouse, for inputting operation. The display 16 and the operation unit 18 receive various instructions from a user of the server apparatus 10. The display 16 displays various types of information such as a result of a process executed in response to an instruction received from a user, a notification for a process, and the like.

The communication unit 20 is connected to, for example, the Internet, or the network N such as a LAN or a WAN, and is communicable with each of the image reading apparatus 50, the checker terminal apparatus 40, and the administrator terminal apparatus 60 via the network N.

As described above, when the latest version of the recognition dictionary is applied, recognition accuracy may not be increased if a specific bias is generated in learning data of the latest version. In this case, the recognition accuracy is more likely expected to be increased by using the recognition dictionary of another version prior to the latest version.

Figure 3:
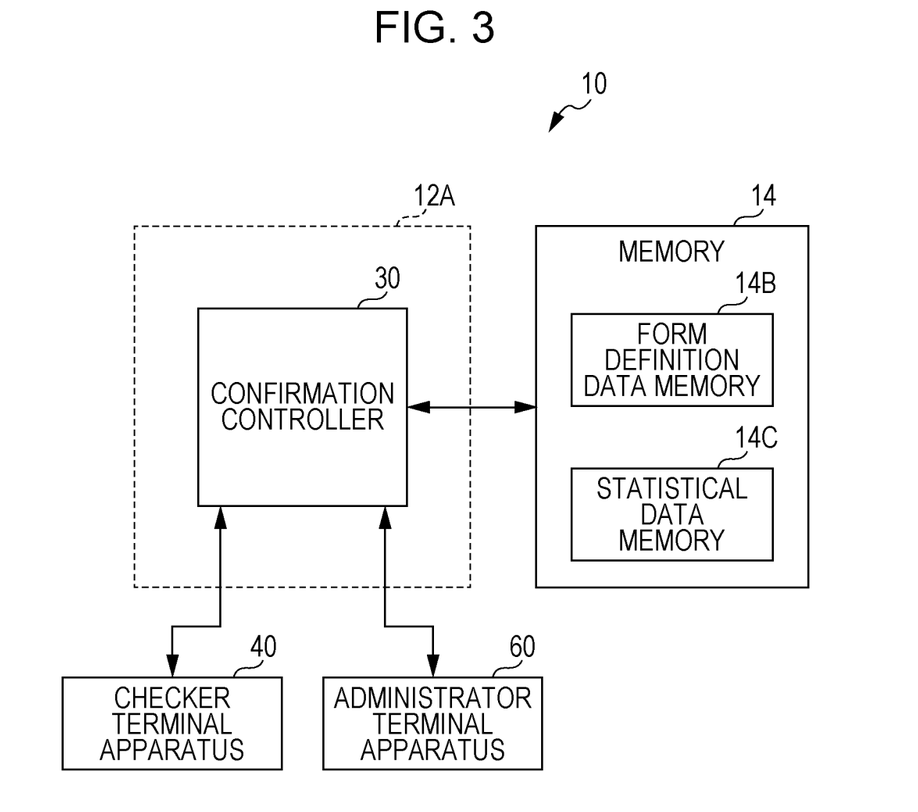
FIG. 3 is a block diagram illustrating an example of a functional configuration of the server apparatus according to the exemplary embodiment.

Therefore, the CPU 12A of the server apparatus 10 according to the exemplary embodiment functions as units illustrated in FIG. 3 by writing the confirmation process program 14A stored in the memory 14 into the RAM 12C and executing the program.

FIG. 3 is a block diagram illustrating an example of a functional configuration of the server apparatus 10 according to the exemplary embodiment.

As illustrated in FIG. 3, the CPU 12A of the server apparatus 10 according to the exemplary embodiment functions as a confirmation controller 30. The confirmation controller 30 is an example of a selection unit, a learning unit, a reception unit, and a notification unit. In the exemplary embodiment, a case where a form is applied as an example of a document will be described.

The memory 14 according to the exemplary embodiment is provided with a form definition data memory 14B that stores form definition data, and a statistical data memory 14C that stores statistical data.

The confirmation controller 30 according to the exemplary embodiment, when a target form is recognized, selects a first mode in which a latest version of a recognition dictionary is applied, or a second mode in which a version (hereinafter referred to as "recommended version") of the recognition dictionary is applied, the version having the highest correct answer rate among a plurality of versions different from the latest version. The latest version in this case represents a version having the newest update date and time. The correct answer rate is derived from the recognition result and the confirmation or correction result of each of a plurality of written forms, Specifically, the correct answer rate is expressed as a proportion of recognition results that have not been subjected to confirmation or correction with respect to all recognition results. The recognition result and the confirmation or correction result are stored as statistical data in the statistical data memory 14C. In the exemplary embodiment, a case is described where a recognition process is performed on a definition region (item) basis of a target form; however, the recognition process may be performed on a form basis.

Furthermore, the confirmation controller 30 may select a third mode in which a version (hereinafter referred to as "individual version") individually designated by a user other than the latest version and the recommended version is applied. As the individual version, for example, a version having a high correct answer rate which is expected from user's experience, or a version having a high correct answer rate which is expected for a certain item is designated. In the exemplary embodiment, modes described here include the first mode, the second mode, and the third mode; however, modes may not include the third mode.

Figure 4:
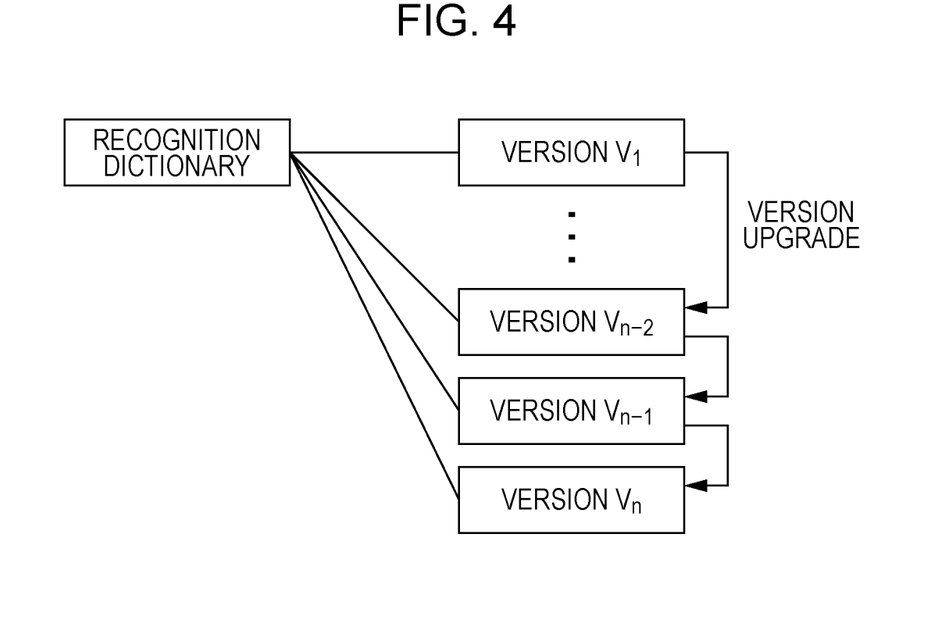
FIG. 4 is a diagram used for describing a relationship between a recognition dictionary and a version according to the exemplary embodiment.

FIG. 4 is a diagram used for describing a relationship between a recognition dictionary and a version according to the exemplary embodiment.

The recognition dictionary illustrated in FIG. 4 includes a number n of versions, and n versions of the recognition dictionary are stored in the memory 14.

In the example illustrated in FIG. 4, a version $V_1$ is the oldest, and a version $V_n$ is the newest. The recognition dictionary is subjected to machine learning by using accumulated learning data every predetermined interval (for example, two weeks), and the version is upgraded.

Figure 5:
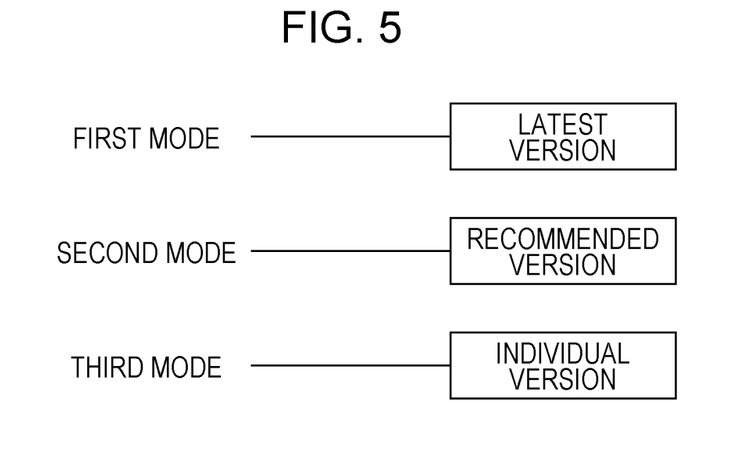
FIG. 5 is a diagram used for describing a relationship between a mode and a version according to the exemplary embodiment.

FIG. 5 is a diagram used for describing a relationship between a mode and a version according to the exemplary embodiment.

Referring to FIG. 5, a first mode is associated with a latest version, a second mode is associated with a recommended version, and a third mode is associated with an individual version.

Specifically, the latest version illustrated in FIG. 5 is the version $V_n$ illustrated in FIG. 4. The recommended version is the version having the highest correct answer rate among a version $V_{n-1}$ to a version $V_1$. The individual version is the version designated by a user, other than the latest version and the recommended version.

The confirmation controller 30 according to the exemplary embodiment performs the machine learning on the above-described statistical data, thereby selecting the version of the recognition dictionary to be applied to each item of the target form. An example of the machine learning is a neural network. Specifically, a recognition result is learned as a correct answer when confirmation or correction is not performed on the recognition result using the first mode, and a recognition result is learned as an incorrect answer when confirmation or correction is performed on the recognition result using the first mode. When the proportion of recognition results learned as correct answers is equal to or more than a threshold, the first mode is selected. When the proportion of recognition results learned as correct answers is less than the threshold, the second mode is selected.

On the other hand, when confirmation or correction is not performed on a recognition result using any one of a plurality of versions different from the latest version, the confirmation controller 30 learns the recognition result as a correct answer. When confirmation or correction is performed on a recognition result using any one of the plurality of versions, the confirmation controller 30 determines the result corrected through the confirmation or correction as correct answer data, and learns, as a correct answer, another version that outputs the correct answer data as the recognition result of the written form. When the second mode is selected, the version with which a recognition result is learned as a correct answer the largest number of times among the plurality of versions is determined as the recommended version of the second mode.

The confirmation controller 30 stores the version of the recognition dictionary selected as described above in the form definition data memory 14B, as part of the form definition data.

Here, the confirmation controller 30 may select the first mode when the writer of the written form has been specified, and may select the second mode when the writer of the written form has not been specified. The situation in which the writer of the written form has been specified may be, for example, a case where the written form is one of various application forms to be used in a certain company and the writer of the application form is an employee of the company. In this case, it is desirable to apply the learning result corresponding to the writing habit or the like of the writer. Therefore, by selecting the latest version, the correct answer rate is expected to be increased. In addition, the situation in which the writer of the written form has not been specified may be, for example, a case where the written form is a questionnaire form for a certain product and the writer is one of an unspecified number of respondents of the questionnaire form, or a case where the written form is one various application forms to be used in a public institution, such as a city office or a ward office, and the writer of the application form is a citizen or a ward resident. In this case, it is desirable to apply a learning result having a high correct answer rate regardless of the writing habit or the like of the writer. Therefore, by selecting the recommended version, the correct answer rate is expected to be increased.

Next, a specific configuration of the server apparatus 10 according to the exemplary embodiment will be described with reference to FIG. 6.

Figure 6:
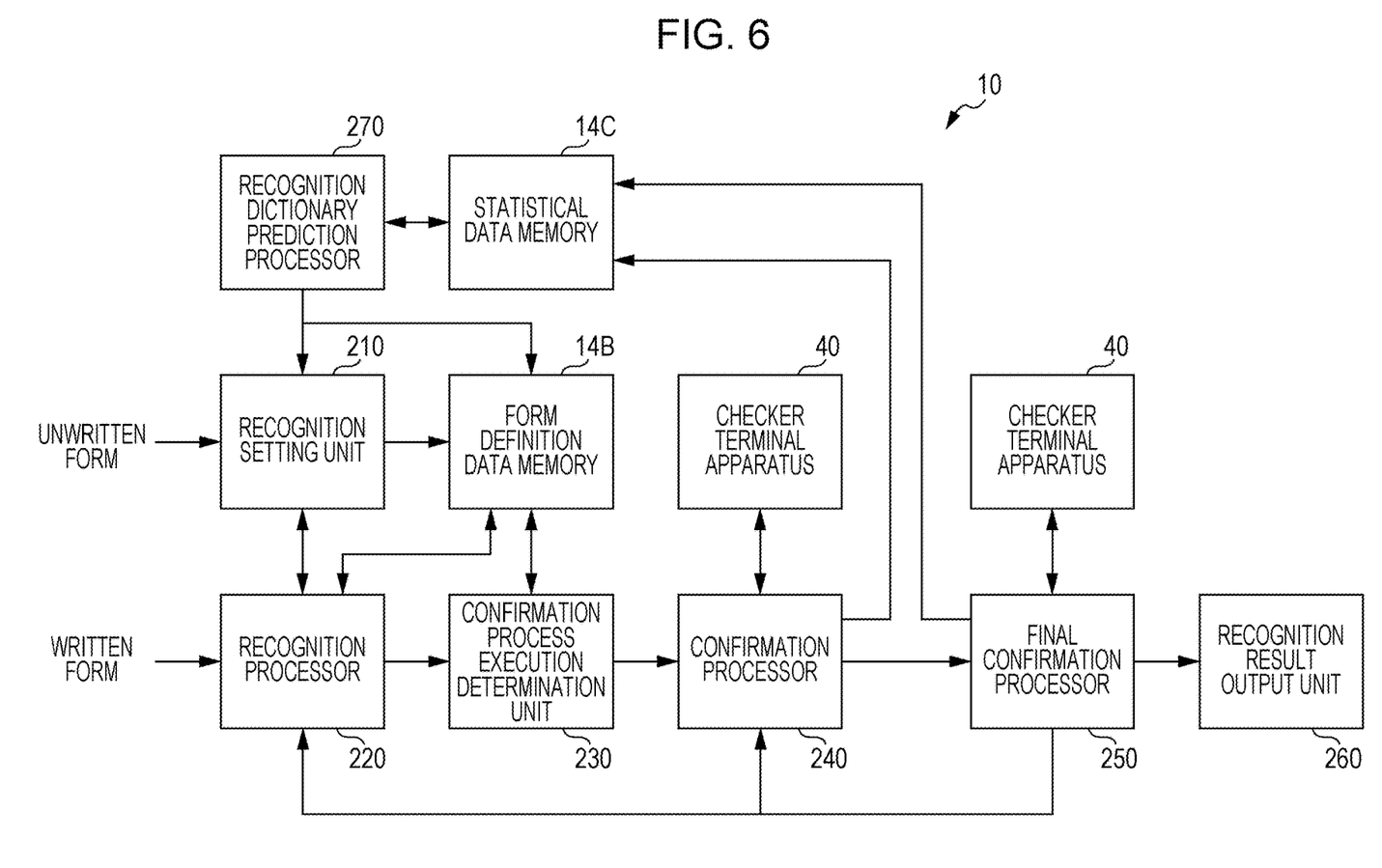
FIG. 6 is a block diagram illustrating an example of a specific configuration of the server apparatus according to the exemplary embodiment.

FIG. 6 is a block diagram illustrating an example of a specific configuration of the server apparatus 10 according to the exemplary embodiment.

As illustrated in FIG. 6, the server apparatus 10 according to the exemplary embodiment includes a recognition setting unit 210, a recognition processor 220, a confirmation process execution determination unit 230, a confirmation processor 240, a final confirmation processor 250, a recognition result output unit 260, and a recognition dictionary prediction processor 270. These units are specific configurations of the confirmation controller 30 illustrated in FIG. 3.

The recognition setting unit 210 according to the exemplary embodiment receives, as an input, a form image of an unwritten form and performs recognition setting. The recognition setting unit 210 causes the administrator terminal apparatus 60 to display, for example, a form definition window 62 illustrated in FIG. 7 to receive an input of form definition data.

Figure 7:
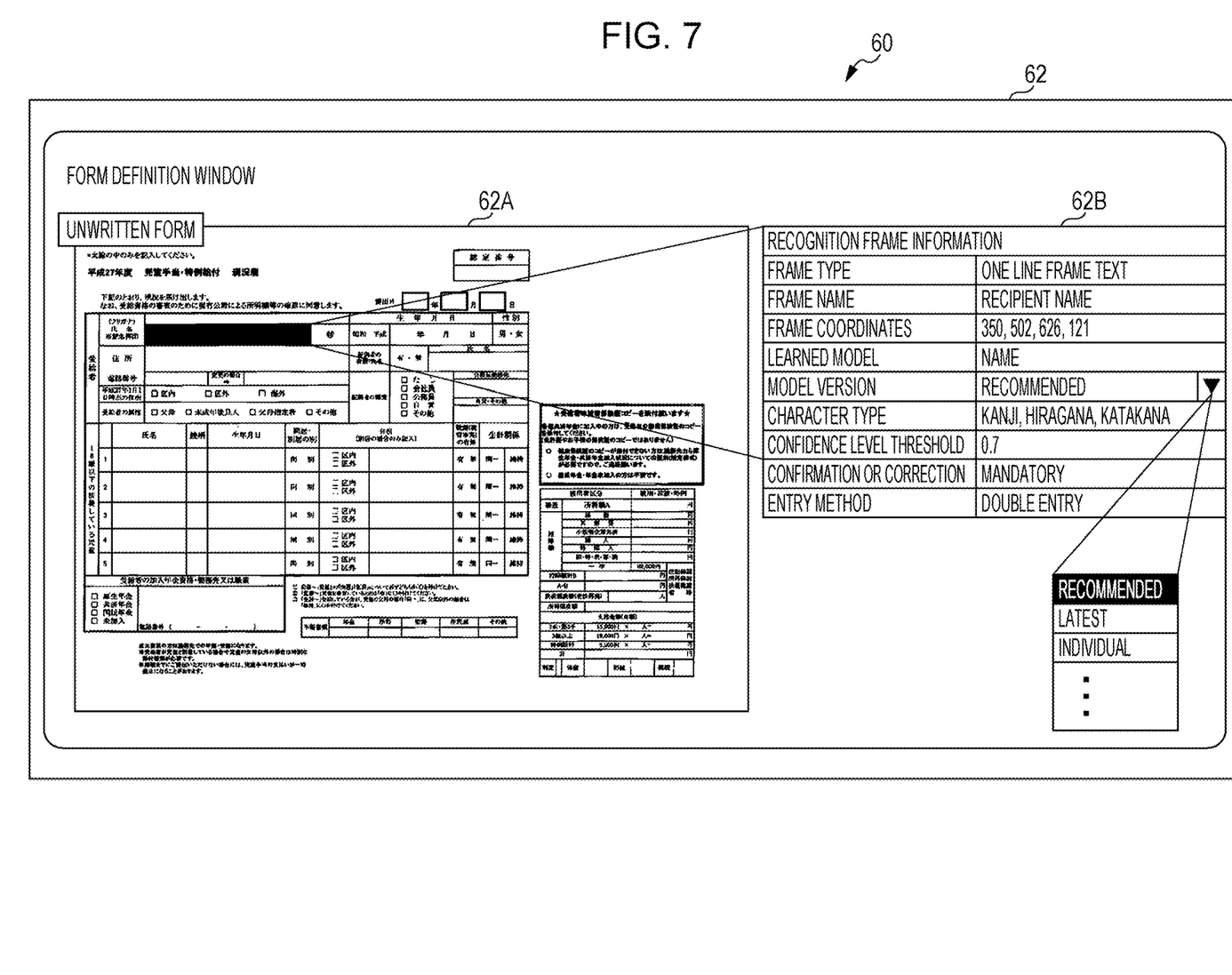
FIG. 7 is a front view illustrating an example of a form definition window according to the exemplary embodiment.

FIG. 7 is a front view illustrating an example of the form definition window 62 according to the exemplary embodiment.

The form definition window 62 illustrated in FIG. 7 is displayed on the administrator terminal apparatus 60, and is a window for receiving an input of form definition data by the system administrator SE. Note that the form definition window 62 is an example of a definition window.

The form definition window 62 illustrated in FIG. 7 includes a preview image 62A of an unwritten form and recognition frame information 62B representing form definition data. The recognition frame information 62B includes, for example, a frame type, a frame name, frame coordinates, a learned model, a model version, a character type, a confidence level threshold, confirmation or correction, and an entry method, and the setting contents are stored in the form definition data memory 14B. The learned model represents a recognition dictionary, and the model version represents a version of the recognition dictionary. In the example illustrated in FIG. 7, information relating to "recipient name" is displayed. The confidence level is an index indicating confidence of the recognition result, and the higher the value of the confidence level, the higher the probability that an item image and a recognition result thereof coincide with each other. As a method for deriving the confidence level, for example, a known technique described in Japanese Unexamined Patent Application Publication No. 2016-212812 or the like may be used. In the case where the confidence level for each character constituting a character string is used, a method of converting the confidence level of each character into the confidence level of the character string is used. Specifically, a suitable one may be selected from the various methods described below.

The maximum value of the confidence level for each character in the character string is regarded as the confidence level of the character string.

The minimum, value of the confidence level for each character in the character string is regarded as the confidence level of the character string.

The average value (mode value, median value, or the like) of the confidence level for each character in the character string is regarded as the confidence level of the character string.

Further, the confirmation or correction is set to determine whether to perform a confirmation work, and for example, "mandatory" or "non-required" is set. When "mandatory" is set, the confirmation work is performed every time, and when "non-required" is set, the confirmation work is not performed.

The entry method is for setting a method for performing the confirmation work, and, for example, one of "double entry", "single entry", "non-required", and "none" is set. "Double entry" is a method for performing the confirmation work by a plurality of checkers, and "single entry" is a method for performing the confirmation work by one checker. "Non-required" is a method in which the confirmation work is not required. "None" is a method in which one of "non-required", "single entry", and "double entry" is selected based on the result of comparison between the confidence level and the threshold ("0.7" in the example of FIG. 7) thereof. In the case of "none", for example, "single entry" or "double entry" is selected when the confidence level is lower than the threshold, and "non-required" is selected when the confidence level is equal to or higher than the threshold.

The learned model is for setting a recognition dictionary for each item, and in the example illustrated in FIG. 7, a recognition dictionary for "name" is set. The model version is for setting a version of the recognition dictionary, and in the example illustrated in FIG. 7, "recommended" is set. In this model version, the version in the selected state is highlighted. In the example illustrated in FIG. 7, the "recommended" version is selected from among "recommended", "latest", "individual", and so forth. Also, these model versions are selectively displayed in a drop-down list, and the selected model version is designated as the version to be applied to the recognition process. The default of the model version may be switched according to setting of the user.

Next, the recognition processor 220 according to the exemplary embodiment receives, as an input, a form image of a written form, and executes the OCR process in accordance with the setting contents of the form definition data stored in the form definition data memory 14B, for each item. The recognition processor 220 outputs an item image, a recognition result, and a confidence level thereof in association with one another, for each item.

The confirmation process execution determination unit 230 according to the exemplary embodiment determines an entry method for each item based on the item image, the recognition result, and the confidence level thereof for each item output from the recognition processor 220. For example, the threshold determination based on the confidence level is not performed on the item in which "single entry" or "double entry" is set as the entry method. Further, the threshold determination based on the confidence level is performed on the item in which "none" is set as the entry method, and the entry method is determined as described above. The confirmation process execution determination unit 230 outputs the determination result to the confirmation processor 240.

The confirmation processor 240 according to the exemplary embodiment switches the entry method for each item based on the determination result received from the confirmation process execution determination unit 230, feeds back the item image and the recognition result to the checker U, and causes the checker U to perform the confirmation work. Specifically, when the entry method of the recognition result is determined as the single entry, the confirmation processor 240 causes one checker terminal apparatuses 40 to display a confirmation window for performing the confirmation work, to perform the confirmation work when the entry method of the recognition result is determined as the double entry, the confirmation processor 240 causes a plurality of checker terminal apparatuses 40 to display confirmation windows for performing the confirmation work, to perform the confirmation work. The confirmation processor 240 outputs the item image, the recognition result, and the confirmation result by the checker U to the final confirmation processor 250.

The final confirmation processor 250 according to the exemplary embodiment causes another checker U who is different from the checker U to perform the final confirmation work based on the item image, the recognition result, and the confirmation result by the checker U received from the confirmation processor 240. Specifically, the final confirmation processor 250 causes the checker terminal apparatus 40 that is used by the other checker U to display a confirmation window for performing the final confirmation work, and obtains the final confirmation result from the other checker U. The final confirmation processor 250 returns the confirmation result to the confirmation processor 240 when the confirmation result of the checker U involves an error, or returns the confirmation result to the recognition processor 220 when the input written form involves a defect (for example, page insufficiency), based on the final confirmation result from the other confirmation unit U. Then, the final confirmation processor 250 outputs the final recognition result to the recognition result output unit 260.

The recognition result output unit 260 according to the exemplary embodiment outputs the final recognition result received from the final confirmation processor 250. The output destination of the final recognition result is not particularly limited; however, at least one of the display 16, the checker terminal apparatus 40, and the administrator terminal apparatus 60 may be used as the output destination.

The confirmation result by the confirmation processor 240 and the final confirmation result by the final confirmation processor 250 are stored in the statistical data memory 14C. That is, the recognition result and the confirmation or correction result for each of the written forms are stored as statistical data in the statistical data memory 14C.

The recognition dictionary prediction processor 270 according to the exemplary embodiment performs the machine learning on the statistical data stored in the statistical data memory 140 as described above, thereby selecting the version of the recognition dictionary to be applied for each item of the target form. Specifically, a recognition result is learned as a correct answer when confirmation or correction is not performed on the recognition result using the latest version, and the recognition result is learned as an incorrect answer when confirmation or correction is performed on the recognition result using the latest version. When the proportion of recognition results learned as correct answers is equal to or more than a threshold, the latest version is selected. When the proportion of recognition results learned as correct answers is less than the threshold, the recommended version is selected.

On the other hand, when the confirmation or correction is not performed on the recognition result using any one of a plurality of versions different from the latest version, the recognition dictionary prediction processor 270 learns the recognition result as a correct answer. When the confirmation or correction is performed on the recognition result using any one of the plurality of versions, the recognition dictionary prediction processor 270 determines the result corrected through the confirmation or correction as correct answer data, and learns, as a correct answer, another version that outputs the correct answer data as the recognition result of the written form. The version with which a recognition result is learned as a correct answer the largest number of times among the plurality of versions is determined as the recommended version.

Figure 8:
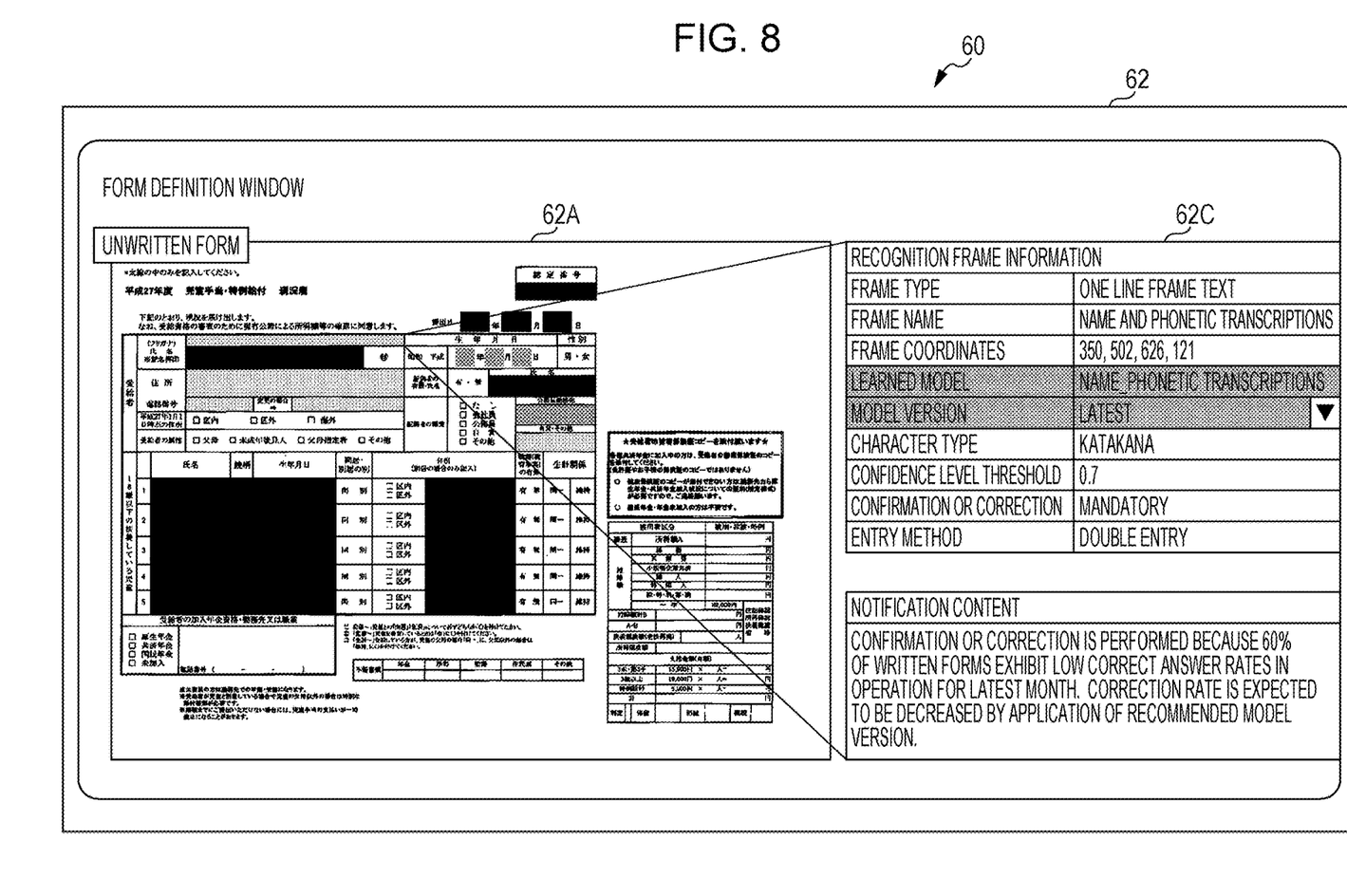
FIG. 8 is a front view illustrating another example of the form definition window according to the exemplary embodiment.

In addition, when the latest version is designated and when a version having a higher correct answer rate than the correct answer rate of the latest version is present among past versions other than the latest version, the recognition dictionary prediction processor 270 notifies the user about the presence of the version, for example, through the form definition window 62 illustrated in FIG. 8.

FIG. 8 is a front view illustrating another example of the form definition window 62 according to the exemplary embodiment.

Similarly to FIG. 7 described above, the form definition window 62 illustrated in FIG. 8 is displayed on the administrator terminal apparatus 60, and is a window for receiving an input of form definition data by the system administrator SE.

The form definition window 62 illustrated in FIG. 8 includes a preview image 62A of an unwritten form and recognition frame information 62C. In the example illustrated in FIG. 8, the recognition frame information 62C relating to "name and phonetic transcriptions" is displayed in this model version, "latest" is designated. In this case, the recognition process is performed using the latest version on part (for example, 1000) of the total number (for example, 10000) of written forms, and the correct answer rate is derived. In this case, the correct answer rates of past versions other than the latest version are also derived in the background. Then, when a version having a higher correct answer rate than the correct answer rate of the latest version is present among the past versions, a notification about the presence of the version is provided to the user, for example, by changing the color of the recognition frame of the target item in the preview image 62A and the color of the target item in the recognition frame information 62C.

Figure 9:
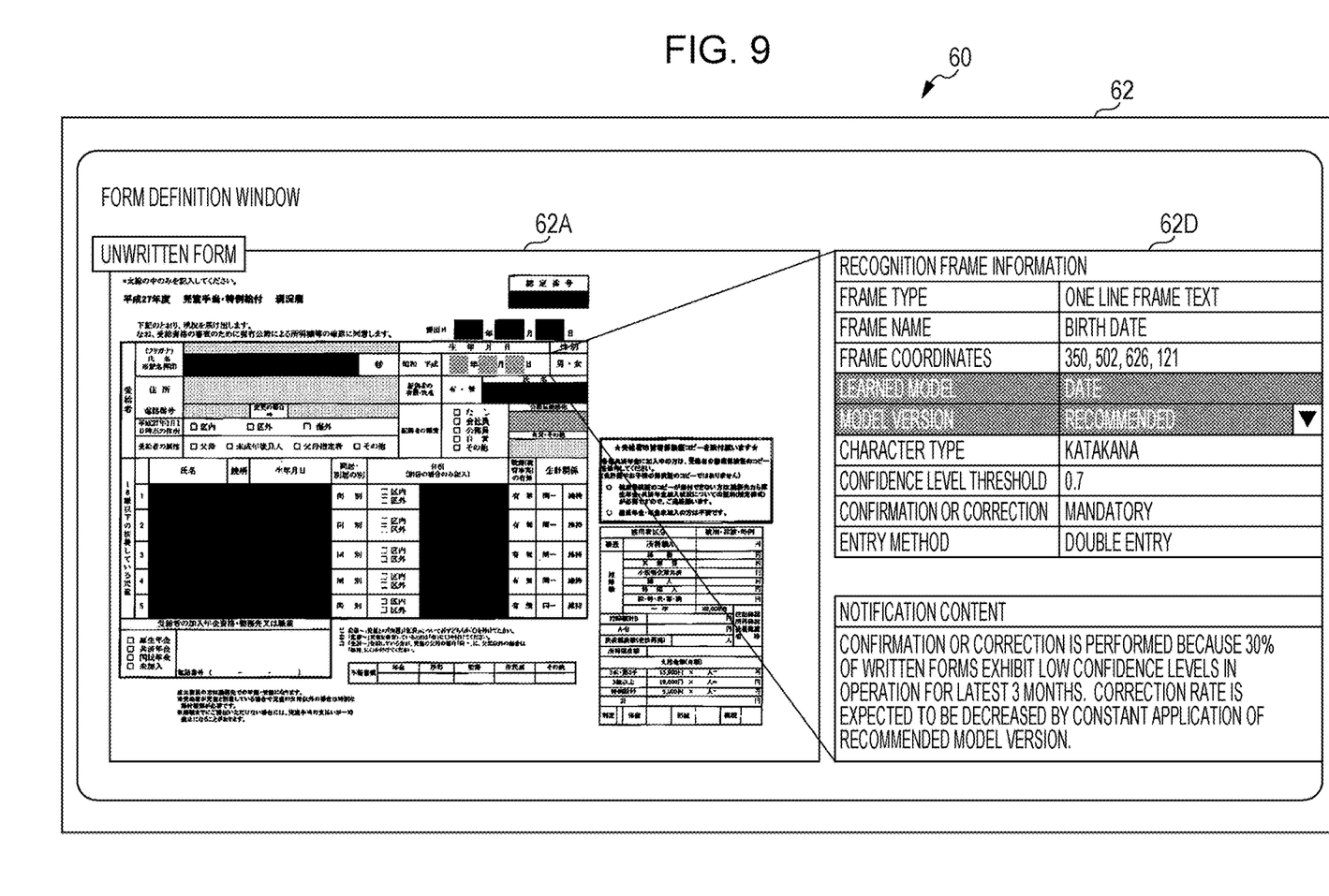
FIG. 9 is a front view illustrating still another example of the form definition window according to the exemplary embodiment.

FIG. 9 is a front view illustrating still another example of the form definition window 62 according to the exemplary embodiment.

Similarly to FIG. 7 described above, the form definition window 62 illustrated in FIG. 9 is a window that displayed on the administrator terminal apparatus 60 and is for receiving an input of form definition data by the system administrator SE.

The form definition window 62 illustrated in FIG. 9 includes a preview image 62A of an unwritten form and recognition frame information 62D. In the example illustrated in FIG. 9, the recognition frame information 62D relating to "birth date" is displayed. In this model version, "recommended" is designated. In this case, the recommended version having the highest correct answer rate among a plurality of versions other than the latest version is constantly applied. A notification about the constant application of the recommended version is provided to the user, for example, by changing the color of the recognition frame of the target item in the preview image 62A and the color of the target item in the recognition frame information 62D.

Next, an operation of the server apparatus 10 according to the exemplary embodiment will be described with reference to FIG. 10.

Figure 10:
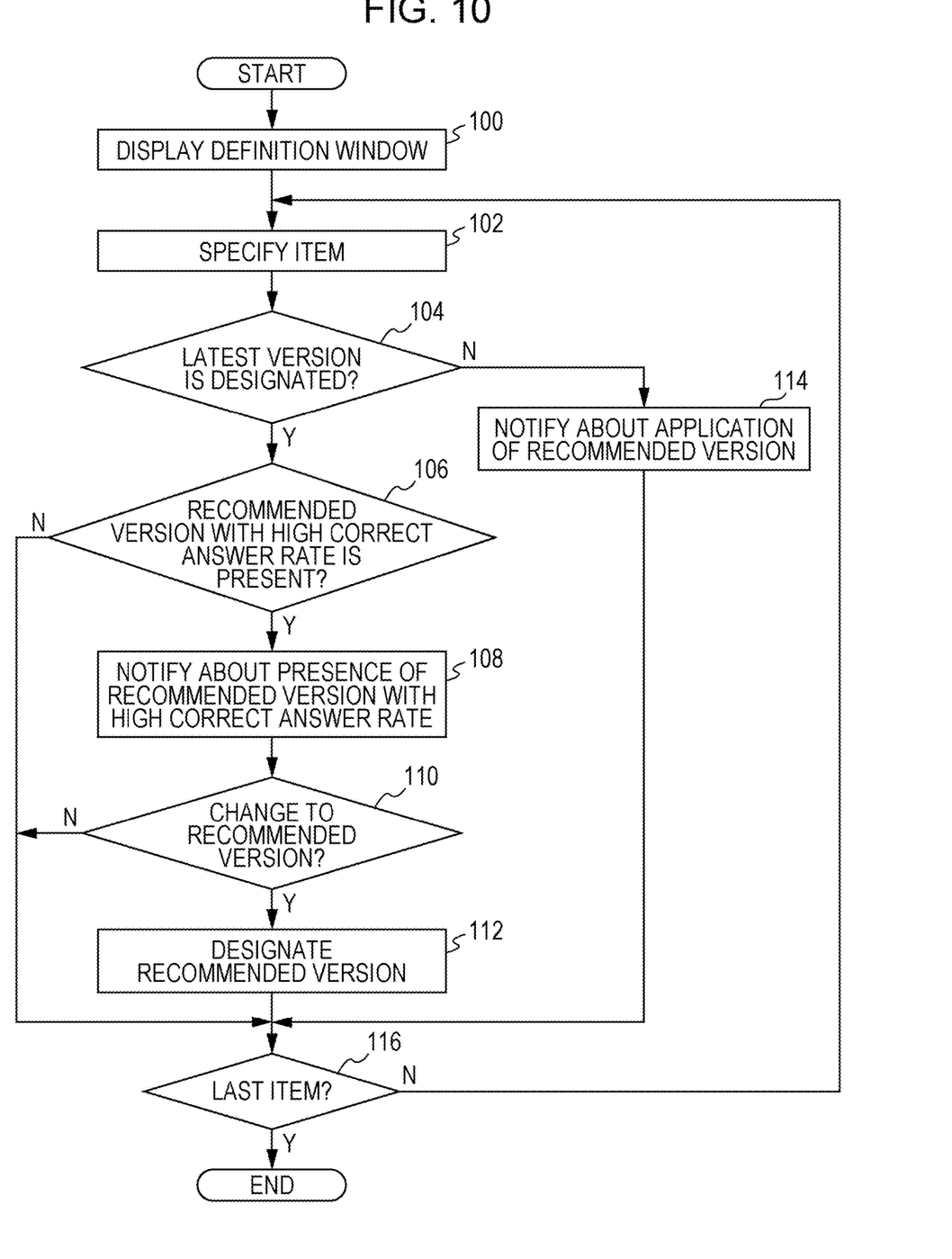
FIG. 10 is a flowchart illustrating an example of a flow of a version notification process by a confirmation process program according to the exemplary embodiment.

FIG. 10 is a flowchart illustrating an example of a flow of the version notification process by the confirmation process program 14A according to the exemplary embodiment.

First, when the display of the form definition window is instructed to the server apparatus 10, the confirmation process program 14A is activated, and the following steps are executed. Here, a case without the individual version is described.

In step 100 of FIG. 10, the recognition dictionary Prediction processor 270 causes the administrator terminal apparatus 60 to display, for example, the form definition window 62 illustrated in FIG. 8.

In step 102, the recognition dictionary prediction processor 270 specifies, for example, one from among a plurality of items included in the form definition window 62 illustrated in FIG. 8.

In step 104, the recognition dictionary prediction processor 270 determines whether the latest version has been designated for the item specified in step 102. When it is determined that the latest version has been designated (when YES (Y)), the process proceeds to step 106. When it is determined that the latest version is not designated (when NO (N)), the process proceeds to step 114.

In step 106, the recognition dictionary prediction processor 270 determines whether a recommended version having a higher correct answer rate than that of the latest version is present. When it is determined that a recommended version having a higher correct answer rate than that of the latest version is present (when Y), the process proceeds to step 108. When it is determined that a recommended version having a higher correct answer rate than that of the latest version is not present (when N), the process proceeds to step 116.

In step 108, for example, the recognition dictionary prediction processor 270 changes the color of the recognition frame of the target item in the preview image 62A and the color of the target item in the recognition frame information 62C in the form definition window 62 illustrated in FIG. 8 described above, thereby providing a notification about the presence of a recommended version having a high correct answer rate.

In step 110, the recognition dictionary prediction processor 270 determines whether the change to the recommended version is instructed. When it is determined that the change to the recommended version is instructed (when Y), the process proceeds to step 112. When it is determined that the change to the recommended version is not instructed (when N), the process proceeds to step 116.

In step 112, the recognition dictionary prediction processor 270 designates a recommended version instead of the latest version, and the process proceeds to step 116.

On the other hand, in step 114, for example, the recognition dictionary prediction processor 270 changes the color of the recognition frame of the target item in the preview image 62A and the color of the target item in the recognition frame information 62D in the form definition window 62 illustrated in FIG. 9, thereby providing a notification about the constant application of the recommended version, and the process proceeds to step 116.

In step 116, the recognition dictionary prediction processor 270 determines whether the item is the last item subjected to the notification of the version. When it is determined that the item is not the last item (when N), the process proceeds to step 102, and when it is determined that the item is the last item (when Y), the version notification process by the present confirmation process program 14A is ended.

In this way, according to the exemplary embodiment, when a form is recognized using the recognition dictionary, it is possible to select the mode in which the latest version of the recognition dictionary is applied or the mode in which the recommended version of the recognition dictionary having the highest correct answer rate among the plurality of versions different from the latest version is applied. Thus, even when a specific bias is generated in the learning data for the latest version, the recognition accuracy is expected to be increased by applying the recommended version.

The server apparatus has been described as an example of the information processing apparatus according to the exemplary embodiment. The exemplary embodiment may be in the form of programs for causing a computer to execute the functions of the respective units included in the server apparatus. The exemplary embodiment may be in the form of a non-transitory computer readable medium storing the programs.

The configuration of the server apparatus described in the above exemplary embodiment is merely an example, and may be modified in accordance with circumstances within a range not departing from the scope of the present disclosure.

Further, the process flow of the program described in the above exemplary embodiment is also an example, and an unnecessary step may be omitted or a new step may be added, and the process order may be changed within a range not departing from the scope of the present disclosure.

In the above exemplary embodiment, the case where the process according to the exemplary embodiment is provided by the software configuration using the computer by executing the program is described; however, the present disclosure is not limited thereto. An exemplary embodiment may be provided, for example, by a hardware configuration or a combination of a hardware configuration and a software configuration.

The foregoing description of the exemplary embodiment of the present disclosure has been provided for the purposes of illustration and description, It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to
when a target document is to be recognized using a recognition dictionary, select either a first mode in which a latest version of the recognition dictionary is applied, or a second mode in which a prior version, different from the latest version, of the recognition dictionary is applied,
the prior version having a highest correct answer rate among a plurality of versions of the recognition dictionary different from the latest version, the correct answer rate being obtained from a recognition result and a confirmation or correction result of each of a plurality of documents.

2. The information processing apparatus according to claim 1, wherein the processor is further programmed to:
learn the recognition result as a correct answer when confirmation or correction is not performed on the recognition result using the first mode, and learn the recognition result as an incorrect answer when confirmation or correction is performed on the recognition result using the first mode,
wherein the processor selects the first mode when a proportion of recognition results learned as correct answers is equal to or more than a threshold, and selects the second mode when a proportion of recognition results learned as correct answers is less than the threshold.

3. The information processing apparatus according to claim 2, wherein the processor
learns the recognition result as a correct answer when confirmation or correction is not performed on the recognition result using any one of the plurality of versions of the recognition dictionary, and
when confirmation or correction is performed on the recognition result using any one of the plurality of versions, determines a result corrected through the confirmation or correction as correct answer data, and learns, as a correct answer, another version that outputs the correct answer data as a recognition result of the document, and
when the processor selects the second mode, the processor determines, as a version of the second mode, a version with which a recognition result is learned as a correct answer a largest number of times among the plurality of versions.

4. The information processing apparatus according to claim 1, wherein the processor
selects the first mode when a writer of the document is specified, and
selects the second mode when a writer of the document is not specified.

5. The information processing apparatus according to claim 2, wherein the processor
selects the first mode when a writer of the document is specified, and
selects the second mode when a writer of the document is not specified.

6. The information processing apparatus according to claim 3, wherein the processor
selects the first mode when a writer of the document is specified, and
selects the second mode when a writer of the document is not specified.

7. The information processing apparatus according to claim 1, wherein the processor is programmed to:
cause a definition window for defining, as a recognition target, the target document that is unwritten to be displayed, and receive designation of a version of one of the first mode and the second mode from the definition window; and
when the first mode is designated and when a version having a higher correct answer rate than a correct answer rate of the latest version is present among past versions other than the latest version, notify a user about the presence of the version through the definition window.

8. The information processing apparatus according to claim 2, wherein the processor is programmed to:
cause a definition window for defining, as a recognition target, the target document that is unwritten to be displayed, and receive designation of a version of one of the first mode and the second mode from the definition window; and
when the first mode is designated and when a version having a higher correct answer rate than a correct answer rate of the latest version is present among past versions other than the latest version, notify a user about the presence of the version through the definition window.

9. The information processing apparatus according to claim 3, wherein the processor is programmed to:
cause a definition window for defining, as a recognition target, the target document that is unwritten to be displayed, and receive designation of a version of one of the first mode and the second mode from the definition window; and
when the first mode is designated and when a version having a higher correct answer rate than a correct answer rate of the latest version is present among past versions other than the latest version, notify a user about the presence of the version through the definition window.

10. The information processing apparatus according to claim 4, wherein the processor is programmed to:

cause a definition window for defining, as a recognition target, the target document that is unwritten to be displayed, and receive designation of a version of one of the first mode and the second mode from the definition window; and when the first mode is designated and when a version having a higher correct answer rate than a correct answer rate of the latest version is present among past versions other than the latest version, notify a user about the presence of the version through the definition window.

11. The information processing apparatus according to claim 5, wherein the processor is programmed to:

a reception unit that causes cause a definition window for defining, as a recognition target, the target document that is unwritten to be displayed, and receive designation of a version of one of the first mode and the second mode from the definition window; and when the first mode is designated and when a version having a higher correct answer rate than a correct answer rate of the latest version is present among past versions other than the latest version, notify a user about the presence of the version through the definition window.

12. The information processing apparatus according to claim 6, wherein the processor is programmed to:

cause a definition window for defining, as a recognition target, the target document that is unwritten to be displayed, and receive designation of a version of one of the first mode and the second mode from the definition window; and when the first mode is designated and when a version having a higher correct answer rate than a correct answer rate of the latest version is present among past versions other than the latest version, notify a user about the presence of the version through the definition window.

13. A non-transitory computer readable medium storing a program causing a computer to execute a process for information processing, the process comprising:

when a target document is to be recognized using a recognition dictionary, selecting either a first mode in which a latest version of the recognition dictionary is applied, or a second mode in which a prior version, different from the latest version, of the recognition dictionary is applied, the prior version having a highest correct answer rate among a plurality of versions of the recognition dictionary different from the latest version, the correct answer rate being obtained from a recognition result and a confirmation or correction result of each of a plurality of documents.

14. An information processing apparatus comprising:

selection means for, when a target document is to be recognized using a recognition dictionary, selecting either a first mode in which a latest version of the recognition dictionary is applied, or a second mode in which a prior version, different from the latest version, of the recognition dictionary is applied, the prior version having a highest correct answer rate among a plurality of versions of the recognition dictionary different from the latest version, the correct answer rate being obtained from a recognition result and a confirmation or correction result of each of a plurality of documents.

15. The information processing apparatus according to claim 1, wherein the confirmation or the correction result is obtained from a person checking correctness of a character recognition on each of the plurality of documents.

* * * * *